United States Patent [19]

Standish

[11] 3,801,300
[45] Apr. 2, 1974

[54] PROCESS FOR FERTILIZING AND TREATING SOIL CONTAINING NEMATOCIDES AND COMPOSITIONS THEREFOR

[75] Inventor: Norman W. Standish, Shaker Heights, Ohio

[73] Assignee: The Standard Oil Company, Cleveland, Ohio

[22] Filed: Dec. 28, 1970

[21] Appl. No.: 102,088

[52] U.S. Cl. .................................................... 71/3
[51] Int. Cl. ..................................................... A01n
[58] Field of Search ............... 71/3, 4, 105; 424/304

[56] References Cited
UNITED STATES PATENTS 2,356,075   8/1944   Migndichion ...................... 424/304
2,424,520   7/1947   Tonkin ..................................... 71/4
2,433,742   12/1947  Davis ................................... 424/304
3,440,034   4/1969   Fuller ................................... 71/119
3,608,084   9/1971   Matt .................................... 424/304

FOREIGN PATENTS OR APPLICATIONS 512,691   9/1939   Great Britain ..................... 424/304

Primary Examiner—James O. Thomas, Jr.
Attorney, Agent, or Firm—John F. Jones; Sherman J. Kemmer; Evelyn R. Kosman

[57] ABSTRACT

An aqueous nitrogen fertilizer-nematocide solution comprising a carbamide such as urea and an olefinically unsaturated nitrile such as acrylonitrile is disclosed. The nematocidal properties of the olefinically unsaturated nitrile are enhanced by the combination of the olefinically unsaturated nitrile with the carbamide.

2 Claims, No Drawings

PROCESS FOR FERTILIZING AND TREATING SOIL CONTAINING NEMATOCIDES AND COMPOSITIONS THEREFOR

The present invention relates to a novel fertilizer and nematocide composition and more particularly pertains to a synergistic aqueous fertilizer-nematocide solution comprising water, a carbamide and an alpha, beta-olefinically unsaturated nitrile such as acrylonitrile.

Acrylonitrile has been used as an insect toxicant and usually in mixtures. One acrylonitrile mixture which has been previously described is a mixture of equal parts acrylonitrile and carbon tetrachloride (*J. Econ. Entomol.* 42, 646-, 1949). Another such mixture is acrylonitrile and trichloroacetonitrile (*J. Econ. Entomol.* 36, 116-17, 1943). Many of the known nematocides are phytotoxic. The practice has been either to give a pre-planting treatment with phytotoxic nematocides to the soil, making certain the insect toxicants are diffused out of the soil before planting, or to apply the nematocide materials at a sufficient distance from growing plants to prevent diffusion of phytotoxic concentrations of the toxicant through the soil to the roots of the plants. Such precautions are not required in the use of the fertilizer-nematocide compositions of the present invention because the nematocide is not phytotoxic.

An object of this invention is the provision of a fertilizer which is also an effective toxicant to organisms injurious to plant life. Such a combined fertilizer toxicant should lend itself to easy application with conventional equipment at any time before or during the plant's growth cycle, should be relatively non-toxic to plant life, non-irritating to the skin, and should require no delay for the diffusion of toxic vapors.

A further object of this invention is the provision of a composition which when applied to the soil simultaneously increases the soil fertility and decreases the soil phytopathogen population.

Another object is the provision of a method for simultaneously increasing soil fertility and decreasing the population of organisms injurious to plant life.

In accordance with this invention, it has been found that certain novel water solutions containing as the essential ingredients a carbamide such as urea, and an alpha,beta-olefinically unsaturated nitrile such as acrylonitrile, have an outstanding fertilizing and nematocidal action and none of the disadvantages discussed above. We have discovered that the compositions of this invention exhibit remarkable and completely unexpected synergism resulting in a striking increase in the nematocidal activity of the acrylonitrile. In addition to the carbamide, acrylonitrile and water, our novel fertilizer composition may also contain at least one other fertilizer component such as potassium nitrate, sodium nitrate, ammonia, ammonium nitrate, superphosphates, natural organic matter such as guano, digested sludge and the like.

The alpha,beta-olefinically unsaturated nitriles useful in the present invention include acrylonitrile, methacrylonitrile, alpha-halo acrylonitriles such as chloroacrylonitrile, cinnamonitrile and atroponitrile and others. Most preferred is acrylonitrile.

Specific carbamides which are included within the scope of this invention are urea, acetamide, formamide, dimethyl formamide, methyl urea, semicarbazide, pyrrolidone, N-methyl-2-pyrrolidone, N-ethyl pyrrolidone and the like. More preferred carbamides are urea, formamide and acetamide because of their low cost and ready availability, and most preferred is urea.

The following example will indicate unobvious properties of the compositions of this invention and the manner in which they may be employed both as fertilizer and in the control and eradication of soil nematodes. The invention is also illustrated by examples, in all of which the parts referred to are parts by weight unless otherwise stated.

EXAMPLE

In accordance with this invention, it has been discovered that certain solutions comprising a carbamide, such as urea, an unsaturated nitrile such as acrylonitrile, and water exhibit unexpectedly high toxic effect on organisms injurious to plant life. The data in the table show that solutions of acrylonitrile and urea in water exhibit a synergistic nematocidal effect, unexpectedly greater than the "kill" of acrylonitrile in aqueous solution. This "kill" enhancement is particularly apparent at low nitrogen dosage rates, an unexpected useful coincidence as certain crops, such as tobacco, cannot tolerate high nitrogen dosages. The "kill" is usually measured as "percent kill", this being the actual count of the number of nematodes killed in a 48 hour period of exposure to a dose of nematocide injected into the bottom of a small jar filled with moist sand, as compared with the total number of live nematodes originally present in the jar. The particular compound at the dosage rate to be tested is injected into three of six jars, each of which is "seeded" with the same number of live nematodes. The average number of nematodes surviving in the three test jars as compared with the average number surviving in the three "control" jars is used as the basis for computing "kill".

TABLE

| Dosage (lbs. acrylonitrile/acre) | % Kill | Composition Used for Treatment |
|---|---|---|
| 14.4 | 7.7 | Aqueous acrylonitrile solution with no urea dissolved. |
| 45 | 14.3 | |
| 50 | 80 | 7.3 parts by weight of acrylonitrile in 100 parts of water. |
| 75 | 92.7 | |
| 100 | 99+ | |
| 14.8 | 14 | Aqueous acrylonitrile solution with urea dissolved in equal parts by weight of water. (50:50 parts by weight urea-H$_2$O plus 9.36 parts by weight of acrylonitrile.) |
| 45 | 44.5 | |
| 50 | 84 | |
| 75 | 96/8 | |
| 100 | 99+ | |
| 68 | 98 | 28 parts urea, 28 parts ammonium nitrate, 44 parts water and 8.5 parts acrylonitrile. |

A higher percent kill may be obtained by increasing the dosage of acrylonitrile per acre. A peculiar property of aqueous-urea-acrylonitrile solutions is that they exhibit a relatively flat lethal dosage curve; that is, a dosage of 45 pounds acrylonitrile/acre in an aqueous urea solution will kill 44.5 percent of all nematodes, and 5 pounds acrylonitrile/acre variation will vary the kill from 20 percent at 40 pounds/acre to 84 percent at 50 pounds/acre. This characteristic of these compositions is evident even when other compounds such as potassium nitrate, sodium nitrate, potassium chloride, diammonium phosphate, ammonia, and the like are incorporated into the solution. Results similar to the foregoing were obtained when alpha-chloroacrylonitrile was used in place of acrylonitrile.

In the use of the compositions disclosed in this invention it is desirable to calculate the amount of fertilizer required based on the nitrogen demand of the soil for the particular crop sown. Excess fertilizer is not used by the crop, may actually cause plant damage, and is thus a wasteful expense. At the same time, this calculated fertilizer demand of the soil should also supply such amount of nematocidal action as to destroy effectively at least 80 percent of the nematodes that infest the soil. Apart from economic desirability, the amount of the instant fertilizer-nematocidal composition that may be employed in the control and eradication of soil nematodes is not critical and the actual amount to be employed, depending upon the type of crop, the area to be treated and the type of nematodes to be controlled, is readily determined by simple experiments.

The term "plant" as used in this specification extends to propagative material in general and includes for instance seeds, bulbs and corms. The term "soil" as used in this specification includes earth, mold, compost and any other substrates in which plants susceptible to attack by nematodes can be grown.

I claim:

1. A synergistic fertilizer-nematocide composition consisting of an aqueous solution of acrylonitrile, urea and ammonium nitrate wherein the composition consists of about 8.5 parts of acrylonitrile, 28 parts of urea, 28 parts of ammonium nitrate, and 44 parts of water, by weight.

2. A synergistic-fertilizer nematocide composition consisting of an aqueous solution of acrylonitrile, urea and ammonium nitrate wherein the acrylonitrile is present in concentrations from about 8 to 9 parts per each 100 parts by weight of an aqueous solution of urea and ammonium nitrate, and wherein the urea and ammonium nitrate are present in said aqueous solution in equal concentrations each in the amount of from 25 to 31 parts per 100 parts by weight of solution.

* * * * *